VAPORIZERS.
25

Search Room

Sept. 29, 1942. H. A. FABER Re. 22,185

BOILER Orig. No. 2,168,197

Original Filed July 27, 1937

INVENTOR
Herbert A. Faber
BY
Henry J. Lucke
HIS ATTORNEY

& VAPORIZERS

Reissued Sept. 29, 1942

Re. 22,185

UNITED STATES PATENT OFFICE 22,185

BOILER

Herbert Alfred Faber, Cincinnati, Ohio

Original No. 2,168,197, dated August 1, 1939, Serial No. 155,849, July 27, 1937. Application for reissue July 23, 1940, Serial No. 347,046

12 Claims. (Cl. 122—225)

This invention relates to improvements in boilers; particularly to boilers of the low pressure type employed in generating low pressure steam for circulation throughout a heating system embodying one or more "radiators."

In its simplest form, such a heating system may include the boiler, a steam main rising therefrom and extending laterally, said main pitching downwardly to a low point remote from the boiler, branches tapping said main to bleed steam therefrom for condensation within "radiators" whereby heat exchange is effected, and a return line to return the condensation to the boiler. Generally the return line is at floor level, or at least below the water line of the boiler; such a return is known as a "wet" return.

When the water in the boiler is caused to boil violently or relatively high pressures are generated, a condition often experienced when high-calorific-value fuels are employed, as for example, in modern automatic burners, the boiler may "prime," that is, particles of water are carried, by the velocity of the outgoing steam, into the steam main. Such a condition is undesirable in that heat which is not available for heat-exchange in the radiators has been abstracted from the boiler, thus detracting from the efficiency of the boiler as a heat-generator. Baffles and other similar devices have been utilized to ameliorate this condition.

It has also been the practice to employ devices for preventing the draining of the boiler and the consequent loss of water from the primary heating surfaces, should a break in the return line occur. Installations of a check valve, or the pipe arrangement known as the "Hartford loop" are common, the latter enjoying popularity because of its freedom from movable parts. Disadvantages in employing these devices are that should the break occur at the connection with the boiler, there is no protection; and particularly referring to the Hartford loop, in the complication of the piping at the boiler, as it is necessary to make a connection between the steam main and the condensation inlet port of the boiler, and to bring the wet return line into the connection at a point generally two or three inches below the boiler water line. The loop serves in some measure to maintain a dry steam condition by draining the aforementioned entrapped water back into the boiler through the piping connection.

It is the object of this invention to achieve the advantages of the Hartford loop, without the necessity of a time-consuming special piping installation, by a novel arrangement of passages within the boiler section into which the wet return is connected, the passages being formed by integral walls which additionally and incidentally form an improved baffle for centrifugally separating entrained water from the steam. It is a feature of the invention that provision is made for maintaining an undisturbed water condition within the return water passages, which, as stated, are within the boiler itself. A second feature lies in the fact that the safety loop formed by the passages does not detract from the efficiency of the boiler when used for hot water heating by the circulation of hot water through the heating system.

Figure 1:
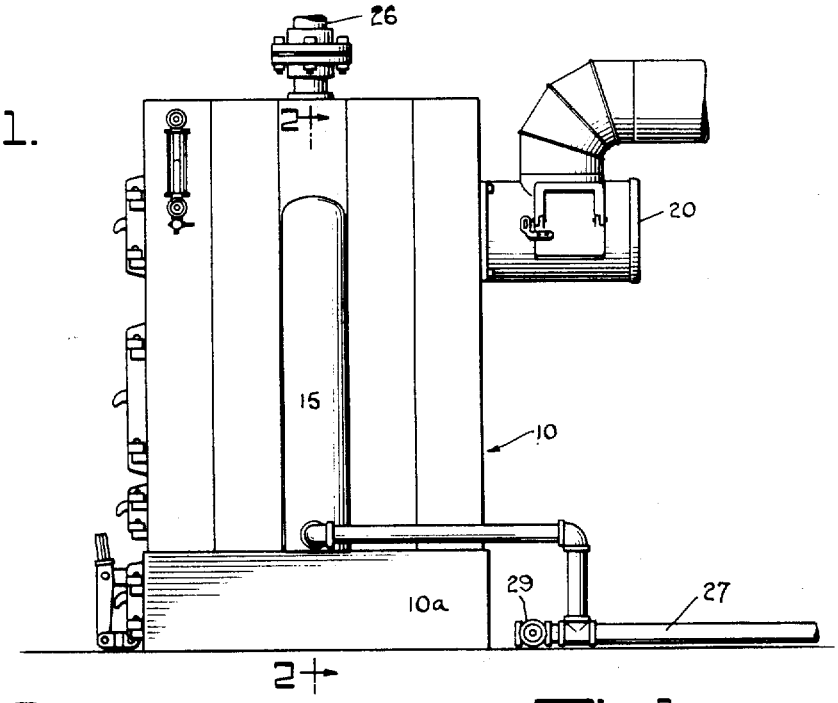
Figure 1 is a representation of a conventional sectional steam boiler embodying my invention.

Referring to the drawing, a low pressure heating boiler 10 includes a plurality of vertical sections mounted and suitably held together on a base 10*a*. The boiler sections may include a rear section 11, a front section 12, and intermediate sections 13, 14 and 15, the sections and the grate 10*b* defining a fire box or chamber 16. Flue gas passages 17, 18 are formed by the registry of the sections. In accordance with familiar practice, the flue gas passages connect with an outlet source, such as the smoke pipe 20. Various accessories, without reference numbers, are illustrated to complete the conventional representation of a boiler.

Figure 2:
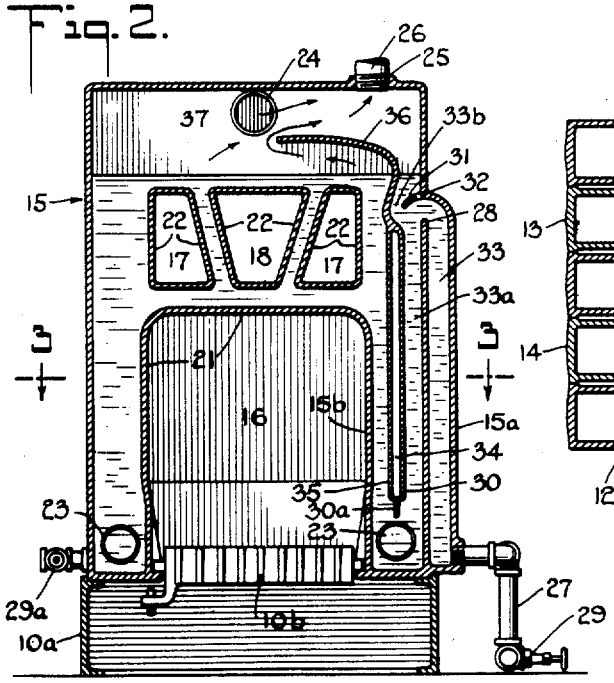
Figure 2 is a vertical section taken through the water return section of the boiler, this figure illustrating water at normal level in the boiler.

Referring to Fig. 2, the configuration of the boiler sections further defines primary heating surface 21, that is, heating surface exposed to the direct play of the fire, and secondary heating surfaces 22 contacted by the hot gases as they pass to the smoke pipe. The boiler sections are interconnected below the water line, by the nipples 23, and above the water line by one or more nipples 24, the latter forming passages through which the steam, generated within the individual boiler sections may flow to an outlet port 25. In a preferred embodiment of this invention, the outlet port is located eccentrically with respect to the centerline of the section, as shown in Fig. 2. A steam main 26, see Figures 1 and 2, may be suitably connected to the boiler at the outlet 25. A wet return conduit 27 is shown in Figures 1 and 2 as coming into the boiler at section 15, the said connection being made near the base of the boiler section.

Draw-off cocks 29, 29a may respectively provide for drawing off the water within the system.

Figure 3:
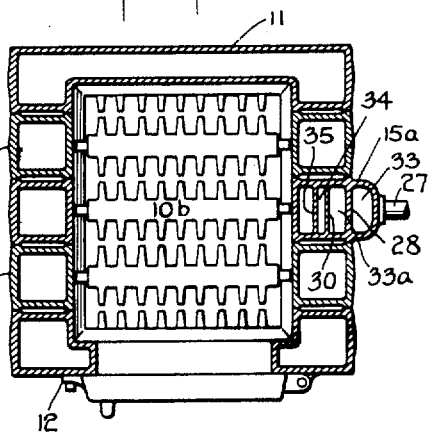
Figure 3 is a horizontal section taken through 3—3 of Figure 2.

To return water to the boiler in a manner insuring the primary heating surfaces of the boiler against drainage of water therefrom, one or more of the boiler sections into which the wet return line may be connected may be formed with an integral serpentine passage or safety loop, formed by walls 28, 30, see Figure 2, provided in a water leg of the section between the outer wall 15a of the section and the adjacent prime-heating wall 15b thereof. The wall 28 preferably terminates below the normal waterline of the boiler, as indicated in Figure 2, a distance of from two to three inches below said waterline being satisfactory. To aid the downward flow of water, there is provided a downwardly curving fin 31, see Figure 2, which may advantageously be a continuation of the curving upper portion of the wall 15a of section 15. The fin acts in cooperation with the walls 15a, 28, 30 to define the loop, the legs of which are indicated by reference numbers 33, 33a in Figs. 2 and 3. The fin 31 may preferably be provided with a small aperture 32, to prevent the pocketing of air and/or steam within the crown of the loop.

It is a feature of the invention that a relatively low water temperature, as compared with water in the steam generating passages, is maintained within the loop, and that ebullition of the water in the leg 33a is precluded. To this end, there is provided a fin 30a depending downwardly from the wall 30 to substantially bar the passage of steam bubbles into the loop-passage 33a, plus an actual insulation of the water in the passage 33a from the heating effect of the prime-heating wall 15b. Advantageously, the stated insulation may be a dead air-space 34 formed by an auxiliary wall 35 spaced from, and connected to, wall 30, as shown in Fig. 2.

A continuation of the wall 30 may rise from the juncture of the said walls 30, 35 to form an upwardly and laterally-curving extension of baffle-plate 36, preferably overlying the water surface of the boiler within the steam-dome 37 thereof, as shown in Fig. 2, and thus preventing direct steam flow from the water surface beneath the baffle to the outlet 25.

It will be seen that my invention provides for protection of the primary heating surface of the boiler against burning out due to a drainage of water from the return conduit or its connection at the boiler during a period in which live heat is present in the boiler fire box; for preventing cool water from coming into contact with a heated surface of the boiler; and for maintaining a dry steam condition at the steam outlet, without the use of a check valve, Hartford loop, or other complex piping arrangement.

Referring to Fig. 2, it is seen that the return line 27 is tapped directly into the boiler section. Water entering the boiler flows upwardly in the leg 33, and downwardly in leg 33a whence it is distributed to boiler section 15 and, through the nipples 23, to other boiler sections; the downward passage of the water in leg 33a being induced by the fin 31, and aided by the fact that the water in the leg is free of upwardly traveling steam bubbles or bubble-induced currents. It will be seen also that baffle 36 precludes the passage of steam bubbles into the space surrounding the fin 31.

Should a break occur in the return line 27 or at any point within the leg 33 water may drain from the boiler only to the top of wall 28, which, as shown, is well above the primary heating surfaces of the boiler. The loss of a portion of the water from the secondary heating surfaces is harmless because of the relatively low temperature of the flue gases in contact therewith, although it is obvious that modifications within the scope of the invention may provide for maintaining a submerged condition of all heating surfaces, both primary and secondary. It will also be seen that by terminating the fin 31 short of the wall 30 a passage 33b is formed between the steam dome and the loop, said passage being above the terminus of wall 28; pressure in the loop is thereby equalized with boiler pressure, and the possibility of siphonage of water over the wall 28 eliminated.

It is obvious that the baffle 36, by causing steam arising in that portion of boiler section 15 adjacent the outlet 25 to make a sharp change in direction of flow before passing through the said outlet will cause entrained water particles to be thrown out by centrifugal effect. The directional change necessary to bring steam flowing into section 15 through the nipple 24 into the offset outlet 25 has a similar effect, and experience has indicated that in a relatively long carry of steam through a voluminous steam dome as from the portion of section 15 at the left of the overlying baffle 36 to the outlet 25, see Fig. 2, water particles drop out of their own weight, the steam velocity in the relatively large open space constituting the steam dome being insufficient to carry the water particles to the steam outlet.

It is preferred practice to introduce water to the boiler at the coolest part of the water section, to minimize, as much as possible, the dangerous contact of comparatively cool water with a high temperature boiler surface. Predominantly, boiler inlet tappings are at the base of a boiler section. My invention effectively precludes such dangerous contact in a positive manner. As indicated in Fig. 2, water entering through return line 27 reaches the steam-generating space of the boiler only after traversing two passages, namely 33 and 33a, the walls forming which may be nearer the temperature of ebullition in the boiler. By contact with the stated walls, the incoming water abstracts heat therefrom, and thus is warmed before coming into an area defined in part by prime-heating surfaces.

It will be understood that although the foregoing description has had particular reference to low pressure steam generating boilers, the construction is equally applicable, except for the priming elimination feature, to hot water heating boilers, in which the boiler heats water and causes it to be distributed throughout a closed piping system. The fin 31 is of particular value in this connection, as it serves adequately to direct the return water stream downwardly, and thus prevents short circuiting of the water through the boiler. As in a hot water heating system also, the boiler return is made at a low point of the section, it is of equal importance that should a break occur at this point, the boiler primary heating surfaces be protected. This may be accomplished in a hot water heating system boiler embodying my invention, in exactly the same way as in the stated steam boiler installation.

It will be noted that in the accompanying drawing, the boiler section containing the safety

LIQUID HEATERS
& VAPORIZERS, passages is illustrated as having a protuberant side surface. It will be understood that modifications in design can effect a smooth or uniform outer contour of the various sections. The determining factor in the design is only that the cross sectional area of the passages be equivalent to the area of the steam or water outlet ports. To achieve this equalization of areas, both the water legs of a boiler section may be formed with the safety loop, or, in a large installation, a plurality of sections may be formed as indicated in the disclosed embodiment of the invention, and the said sections connected with a simple piping header in accordance with familiar practice.

I claim:

1. In a boiler comprising a grate and a plurality of water-carrying sections associated therewith, said sections being interconnected at a plurality of locations, said sections having primary and secondary heating surfaces, one or more of said sections having outlet and/or return ports; means associated with said return-ported sections for preventing the drainage of water from the primary heating surface in the event of leakage at the point of introduction of return water to the boiler or in a conduit leading thereto, said means including a serpentine loop having pressure-equalization means with respect to said sections, said loop being wholly within the boiler and having its uppermost portion below the normal waterline thereof, and means for thermally insulating one leg of the said loop from the temperature of the fluid in the boiler adjacent the heating surfaces thereof.

2. A boiler including a plurality of water-carrying sections, said sections having primary and secondary heating surfaces, at least one of said sections being adapted to permit the entry of water into the said boiler, said section formed with a plurality of walls arranged to define a serpentine loop, the passages of said loop spaced from the primary and/or secondary heating surfaces of the said boiler section, one of said passages being insulated from said heating surface.

3. In a sectional boiler arranged for hot water or steam generation, a section of said boiler having provision for the connection of a water supply conduit thereto; means for preventing the complete drainage of water from heat exchange surfaces within the boiler exposed to the heat generating medium in the event of leakage at the connection of the water conduit with the said boiler or in the said conduit; said means including a plurality of integral walls arranged to define a loop spaced from the said heat exchange surfaces, said walls including a vertical wall terminating below the water line of the said boiler, and paired walls enclosing an air space within the water carrying portion of the boiler and adjacent the said heat exchange surfaces thereof; said first mentioned wall arranged to form a barrier below the surface of which the water level may not fall in the event of the stated leakage; said second mentioned walls defining an air space effective to negative the heating effect of the said heat exchange surfaces with respect to the said loop.

4. In a steam-generating boiler having normally submerged primary and secondary heating surfaces and a water inlet connection, a water-feed loop formed integral with the boiler and provided at its uppermost portion with an aperture disposed internally of said boiler, said loop having an upflow leg connecting with said water inlet and a downflow leg communicating at its lower end with a main water-containing portion of the boiler, the upper part of said loop being wholly below the normal boiler water level and above primary and secondary surfaces thereof, said loop being arranged to prevent the drainage of water from the primary heating surface and complete drainage of water from the secondary heating surface in the circumstance of drainage of water from the said upflow leg of the loop.

5. A boiler, including a combustion chamber, water-containing boiler sections associated therewith, a portion of said sections arranged with respect to said combustion chamber to form primary heating surface, and water-inlet passage means disposed within a boiler section, said passage means including a loop disposed substantially above said primary heating surface, said loop including a conduit extending downwardly to a point of discharge substantially below said primary heating surface.

6. A boiler, including a combustion chamber, interconnected water-containing boiler sections associated therewith, a portion of said sections arranged with respect to said combustion chamber to form primary heating surface, and water-inlet passage means, disposed within a boiler section and independent of the main water-carrying portion thereof, to prevent drainage of water from primary heating surface, said water-inlet means including a passage extending from a point above said primary heating surface to a point of discharge within said section at a low point thereof.

7. In a water-heating boiler having a combustion chamber and water-containing elements provided with primary and secondary heating surfaces, one of said elements having means for the admission of water to said boiler, means associated with a water-inlet section to prevent drainage of water from the primary heating surface of said boiler in the event of leakage at said water-inlet means, said drainage-prevention means including a serpentine passage having a crown portion disposed within said section above the uppermost position of primary heating surface, and a conduit extending downwardly to a point of discharge into said water-containing element at a low point thereof, said drainage-prevention means having, further, means for establishing a pressure condition within said loop substantially equivalent to boiler pressure, to preclude syphonage of water through said loop.

8. In a boiler having water-containing sections arranged to form primary and secondary heating surfaces and means for connecting a water-return conduit to said water-carrying sections, means for preventing the complete drainage of water from said heating surfaces in the event of leakage at said water-return conduit, said means including walls integral with one of said boiler sections and defining a loop having a passage arranged to direct inflowing water upwardly to a point above the primary heating surface and below the water line of the boiler, and downwardly to a point of discharge into the water-containing sections at a point substantially below the water line of said boiler, the crown portion of said loop provided with vent means communicating with said water-containing sections for substantially equalizing the pressure of the said loop and the pressure of the said boiler.

9. In a boiler arranged for steam generation, an element of said boiler being provided with a steam dome, steam outlet means communicating therewith, and means for the connection of a water-inlet system thereto, said boiler, further, having normally water-backed primary and secondary heat transfer surfaces, means for preventing the drainage of water completely from said heating surfaces in the event of leakage of water from any point of said water-inlet system, said means including walls disposed within said boiler and effective to define a water-inlet passage arranged to direct incoming water upwardly to a point below the normal water line of the boiler and above the uppermost primary heating surface, and downwardly to a low point of the steam-generating portions of said boiler, said walls including an upwardly extending wall delineating between said upflow and downflow passages, and establishing the minimum water level within said loop, and a wall cooperating with said first mentioned wall to define the downward loop passage, said last mentioned wall including an extension into the steam dome of said boiler and overlying said water surfaces intermediate said steam outlet means and said water surfaces, said extension, further, defining a passage affording communication between said loop and said steam dome.

10. A boiler comprising a combustion chamber; walls defining water-carrying chamber means surrounding the said combustion chamber; at least one water inlet means for said water-carrying chamber means, said water inlet means comprising an inlet port adapted to have water supply piping removably connected thereto and being formed in an outer one of said chamber means defining walls at a low level thereof; and walls which, together with a portion of said outer one of the chamber means defining walls, define a conduit, closed lengthwise and at the bottom and extending substantially vertically upwardly within said water-carrying chamber means from said inlet port to a location disposed at least so high that it is above that line below which it would be dangerous for the water level in said water-carrying chamber means to drop, said conduit completely covering and comprehending the said inlet port.

11. A boiler comprising a combustion chamber; walls defining water-carrying chamber means surrounding the said combustion chamber; at least one water inlet means for said water-carrying chamber means, said water inlet means comprising an inlet port adapted to have water supply piping removably connected thereto and being formed in an outer one of said chamber means defining walls at a low level thereof; and walls which, together with a portion of said outer one of the chamber means defining walls, define a conduit, closed lengthwise and at the bottom and extending substantially vertically upwardly within said water-carrying chamber means from said inlet port to a location disposed at least so high that it is above that line below which it would be dangerous for the water level in said water-carrying chamber means to drop, said conduit completely covering and comprehending the said inlet port, and said conduit being open at its upper end in substantially direct communication with the upper portion of said water-carrying chamber means.

12. A boiler comprising walls defining a combustion chamber, and water-carrying chamber means surrounding the said combustion chamber; water-inlet passage means disposed within said water-carrying chamber means, said passage means including a loop disposed substantially above those walls which define the said combustion chamber, said loop communicating substantially directly with the upper part of the water-carrying chamber means and including a conduit extending downwardly to a point of discharge substantially below those said walls which define the said combustion chamber.

HERBERT ALFRED FABER.